(12) United States Patent
Lee

(10) Patent No.: US 11,760,262 B2
(45) Date of Patent: Sep. 19, 2023

(54) SURROUND VIEW MONITORING SYSTEM AND METHOD FOR VEHICLE, AND PARKING ASSIST CONTROL SYSTEM OF VEHICLE

(71) Applicant: HYUNDAI MOBIS CO., LTD., Seoul (KR)

(72) Inventor: Il Gyu Lee, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/096,094

(22) Filed: Nov. 12, 2020

(65) Prior Publication Data

US 2021/0146836 A1 May 20, 2021

(30) Foreign Application Priority Data

Nov. 19, 2019 (KR) .......................... 10-2019-0148666
Nov. 19, 2019 (KR) .......................... 10-2019-0148667

(51) Int. Cl.
| | |
|---|---|
| *B60R 1/00* | (2022.01) |
| *H04N 5/265* | (2006.01) |
| *H04N 5/268* | (2006.01) |
| *G08G 1/16* | (2006.01) |
| *G06V 20/58* | (2022.01) |
| *H04N 23/90* | (2023.01) |
| *B60T 7/12* | (2006.01) |

(52) U.S. Cl.
CPC ................ *B60R 1/00* (2013.01); *G06V 20/58* (2022.01); *G06V 20/586* (2022.01); *G08G 1/168* (2013.01); *H04N 5/265* (2013.01); *H04N 5/268* (2013.01); *H04N 23/90* (2023.01); *B60R 2300/105* (2013.01); *B60R 2300/303* (2013.01); *B60R 2300/806* (2013.01); *B60R 2300/8093* (2013.01); *B60T 7/12* (2013.01)

(58) Field of Classification Search
None
See application file for complete search history.

(56) References Cited

U.S. PATENT DOCUMENTS

| | | | |
|---|---|---|---|
| 2006/0215020 A1* | 9/2006 | Mori .......................... | B60R 1/00 348/148 |
| 2011/0025848 A1* | 2/2011 | Yumiba ................ | B62D 15/029 348/148 |
| 2014/0148971 A1* | 5/2014 | Sobue ................ | B62D 15/0275 701/1 |

(Continued)

FOREIGN PATENT DOCUMENTS

| | | |
|---|---|---|
| KR | 10-1787054 B1 | 11/2017 |
| KR | 10-1987634 B1 | 6/2019 |

*Primary Examiner* — Heather R Jones
(74) *Attorney, Agent, or Firm* — NSIP Law

(57) ABSTRACT

Disclosed is a surround view monitoring system for a vehicle, including a plurality of cameras included in the vehicle and configured to capture images of a region around the vehicle, an image synthesizer configured to form a synthesized image for monitoring the region around the vehicle by synthesizing the images captured by the plurality of cameras, a driving recognizer configured to recognize driving-state information of the vehicle, and a display controller configured to control a display device to selectively display a portion or an entirety of the synthesized image formed by the image synthesizer based on the driving-state information of the vehicle, recognized by the driving recognizer.

10 Claims, 7 Drawing Sheets

(56) References Cited

U.S. PATENT DOCUMENTS

2014/0354816 A1* 12/2014 Inanobe .................... B60R 1/00
                                                          348/148
2019/0228235 A1*  7/2019 Murad ................... G06V 20/56

* cited by examiner

SURROUND VIEW MONITORING SYSTEM AND METHOD FOR VEHICLE, AND PARKING ASSIST CONTROL SYSTEM OF VEHICLE

CROSS-REFERENCE TO THE RELATED APPLICATION

This application claims priority from Korean Patent Application Nos. 10-2019-0148666 and 10-2019-0148667 filed on Nov. 19, 2019, and No. 10-2019-0148667, filed on Nov. 19, 2019 in the Korean Intellectual Property Office, the disclosure of which is incorporated herein by reference in its entirety.

BACKGROUND OF THE INVENTION

1. Field of the Invention

The present invention relates to a surround view monitoring system and method for a vehicle, and more particularly to a system and method for monitoring a region around the vehicle from a point viewed from above, and a parking assist control system for the vehicle using the system and the method.

2. Description of the Related Art

A surround view monitoring (SVM) or around view monitoring (AVM) system for a vehicle is a system that processes images received from four cameras installed in the vehicle and displays regions around the vehicle in the form of a bird's-eye view.

Surround view monitoring of a vehicle uses a camera having a super-wide-angle lens having a field of view of 180 degrees or greater, and thus there is a problem in that parking lines are seriously bent due to distortion, and to overcome the problem, technology for synthesizing images captured by a plurality of cameras based on a mutual consistency standard is required.

However, only a partial image for surround view monitoring may be required depending on a driving situation, and thus there is a problem in that an entire image for surround view monitoring rather obstructs concentration of a driver.

It will be understood that the above matters described in the related art are merely for promotion of understanding of the background of the invention, and should not be recognized as prior art that is well-known to those skilled in the art.

SUMMARY OF THE INVENTION

Therefore, the present invention has been made in view of the above problems, and it is an object of the present invention to provide technology for varying an image of a display of surround view monitoring depending on the driving situation of a vehicle.

In accordance with an aspect of the present invention, the above and other objects can be accomplished by the provision of a surround view monitoring system for a vehicle includes a plurality of cameras included in the vehicle and configured to capture images of a region around the vehicle, an image synthesizer configured to form a synthesized image for monitoring the region around the vehicle by synthesizing the images captured by the plurality of cameras, a driving recognizer configured to recognize driving-state information of the vehicle, and a display controller configured to control a display device to selectively display a portion or an entirety of the synthesized image formed by the image synthesizer based on the driving-state information of the vehicle, recognized by the driving recognizer.

The driving recognizer may receive information on a gear-shifting mode, a driving speed, or a steering angle of the vehicle and recognizes the driving-state information of the vehicle.

The display controller may control the display device to display a portion of the synthesized image, containing a region around a rear side of the vehicle, when the driving recognizer recognizes a current state as a state in which the vehicle travels backwards The surround view monitoring system may further include a detection sensor configured to detect an obstacle around the vehicle, wherein the display controller may control the display device to display the entirety of the synthesized image.

The surround view monitoring system may further include a detection sensor configured to detect an obstacle around the vehicle, wherein the detection sensor may control the display device to display the entirety of the synthesized image when the detection sensor detects that an obstacle is positioned at a preset distance or less from a front side of the vehicle.

The surround view monitoring system may further include a detection sensor configured to detect an obstacle around the vehicle, wherein the detection sensor may control the display device to display the entirety of the synthesized image when the detection sensor detects that the obstacle approaches the region around the front side of the vehicle.

The driving recognizer may receive information on a steering angle of the vehicle, and when the received steering angle is equal to or greater than a preset angle, the display controller controls the display device to display the entirety of the synthesized image.

The surround view monitoring system for the vehicle may further include a detection sensor configured to detect an obstacle around the vehicle, and a collision determiner configured to determine whether there is a possibility that a front side of the vehicle collides with the obstacle detected by the detection sensor based on the driving-state information of the vehicle, recognized by the driving recognizer, wherein the display controller controls the display device to display the entirety of the synthesized image when a collision possibility determiner determines that there is a collision possibility.

In another aspect, a surround view monitoring method for a vehicle may include forming a synthesized image for monitoring a region around the vehicle by synthesizing images captured by a plurality of cameras configured to capture images of the region around the vehicle, and controlling a display device to selectively display a portion or an entirety of the synthesized image based on driving-state information of the vehicle.

The controlling the display device may include controlling the display device to display a portion of the synthesized image, containing a region around a rear side of the vehicle, when recognizing a current state as a state in which the vehicle travels backwards.

The method may further include, prior to the controlling the display device, determining whether there is a possibility that a front side of the vehicle collides with the obstacle detected by a detection sensor based on the driving-state information of the vehicle, wherein the controlling the display device includes controlling the display device to display the entirety of the synthesized image.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
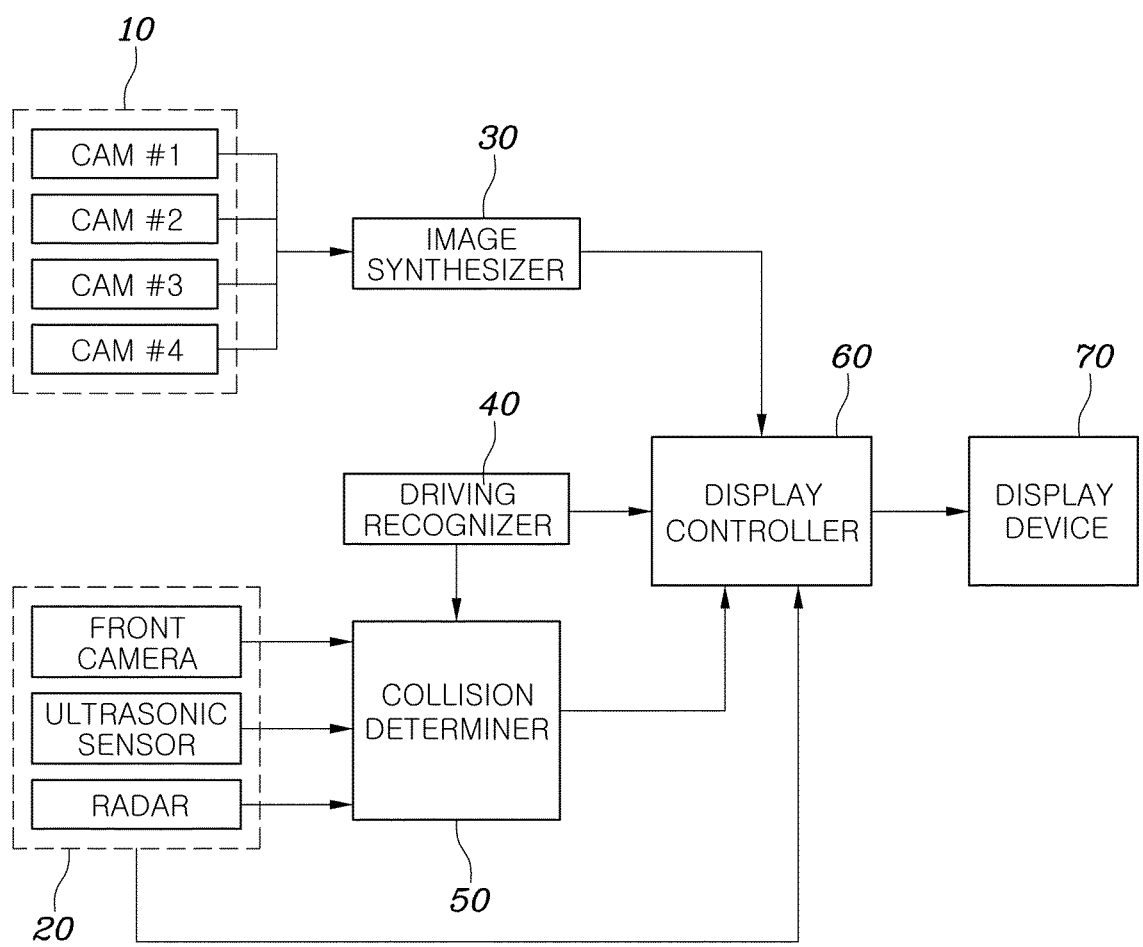
FIG. 1 is a diagram showing the configuration of a surround view monitoring system for a vehicle according to an embodiment of the present invention.

In exemplary embodiments of the present invention disclosed in the specification, specific structural and functional descriptions are merely illustrated for the purpose of illustrating embodiments of the invention and exemplary embodiments of the present invention may be embodied in many forms and are not limited to the embodiments set forth herein.

Exemplary embodiments of the present invention can be variously changed and embodied in various forms, in which illustrative embodiments of the invention are shown. However, exemplary embodiments of the present invention should not be construed as being limited to the embodiments set forth herein and any changes, equivalents or alternatives which are within the spirit and scope of the present invention should be understood as falling within the scope of the invention.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in the present specification are used for explaining a specific exemplary embodiment, not limiting the present invention. Thus, the singular expressions in the present specification include the plural expressions unless clearly specified otherwise in context. Also, terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made in detail to the embodiments, examples of which are illustrated in the accompanying drawings. In the drawings, the same reference numerals in the drawings denote corresponding elements.

FIG. 1 is a diagram showing the configuration of a surround view monitoring system for a vehicle according to an embodiment of the present invention.

Referring to FIG. 1, the surround view monitoring system for the vehicle according to an embodiment of the present invention may be included in the vehicle, and may include a plurality of cameras 10 for capturing images of a region around the vehicle, an image synthesizer 30 for forming a synthesized image for monitoring a region around the vehicle by synthesizing the images captured by the plurality of cameras 10, a driving recognizer 40 for recognizing information on the driving state of the vehicle, and a display controller 60 for controlling a display device 70 to selectively display a portion or an entirety of the synthesized image formed by the image synthesizer 30 based on driving-state information of the vehicle, recognized by the driving recognizer 40.

The camera may be a device for capturing images of a region around the vehicle, and may be a stereo camera. A plurality of cameras may be installed in the vehicle, and may photograph the region around the vehicle from various angles.

According to an embodiment, the plurality of cameras 10 may include a front camera, a rear camera, a left camera, and a right camera to photograph the front side, the rear side, the left side, and the right side of the vehicle, respectively.

The image synthesizer 30, the driving recognizer 40, a collision determiner 50, and the display controller 60 according to an exemplary embodiment of the present invention may be included in an ECU or a separate SVM controller, or may be configured as a separate controller.

In particular, the controller may be embodied as a processor (not shown), configured to perform operations described below using data stored in nonvolatile memory (not shown), and a corresponding memory, configured to store data of an algorithm configured to control the operation of various components of the vehicle or data of a software command for reproducing the algorithm. Here, the memory and the processor may be embodied as respective chips. Alternatively, the memory and the processor may be a single integrated chip. The processor may be configured as one or more processors.

The image synthesizer 30 may form a synthesized image by synthesizing images respectively captured by the plurality of cameras 10. The synthesized image may be an around view image. The image synthesizer 30 may correct tolerance in order to achieve high mutual consistency in a synthesis procedure.

The image synthesizer 30 may form the synthesized image that is the same as a vehicle image viewed from above by synthesizing the images captured by the plurality of cameras 10.

The driving recognizer 40 may recognize the driving-state information of the vehicle. Here, the driving-state information of the vehicle may include information related to driving, such as a driving direction, a steering angle, a gear-shifting mode, and a speed of the vehicle.

The display device 70 may be a device containing an image displayed to a driver, included in an audio, video, and navigation (AVN) system.

The display device 70 may be a device for outputting an image of a region around the vehicle, captured by the camera, to allow a driver to check the image, and may use various image output panels such as a liquid crystal display (LCD) or an organic light-emitting diode (OLED).

Here, the display device 70 may refer to an image output panel such as an LCD, but may also refer to a product such as a personal computer (PC), a notebook computer, or a vehicle navigation device, which includes the image output panel.

The display controller 60 may control the display device 70 to display the synthesized image formed by the image synthesizer 30. Conventionally, when the vehicle speed is equal to or less than a preset speed, the display controller 60 may control the display device 70 to display the synthesized image when a gear-shifting mode of the vehicle is a reverse stage (R) or a driver selects the same.

Figure 2:
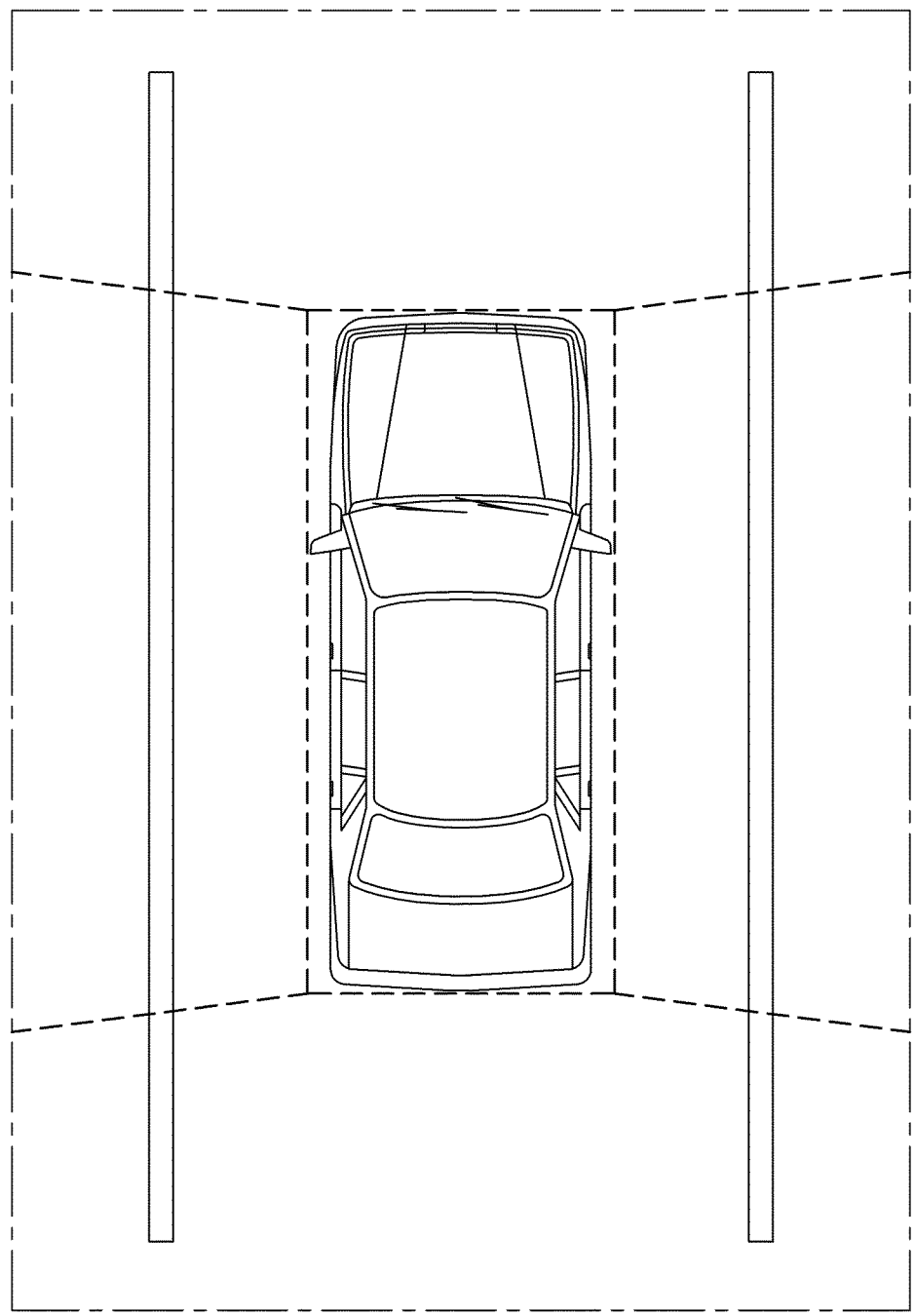
FIG. 2 is a diagram showing an entirety of a synthesized image displayed by a display device according to an embodiment of the present invention.
Figure 3:
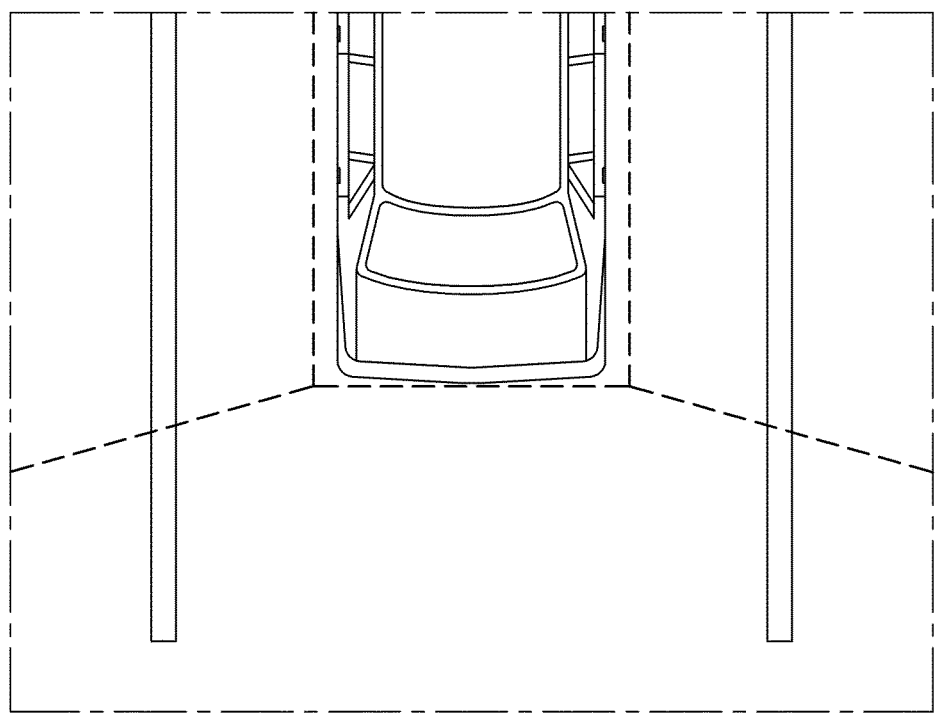
FIG. 3 is a diagram showing a portion of a synthesized image displayed by a display device according to an embodiment of the present invention.

FIG. 2 is a diagram showing an entirety of a synthesized image displayed by the display device 70 according to an embodiment of the present invention. FIG. 3 is a diagram showing a portion of the synthesized image displayed by the display device 70 according to an embodiment of the present invention.

Further referring to FIGS. 2 to 3, the display controller 60 according to an embodiment of the present invention may control the display device 70 to selectively display a portion or an entirety of the synthesized image based on driving-state information of the vehicle, recognized by the driving recognizer 40.

That is, as shown in FIG. 2, the display controller 60 may control the display device 70 to display the entirety of the synthesized image according to the driving-state information, or as shown in FIG. 3, the display controller 60 may control the display device 70 to display only a portion of the synthesized image. Thus, convenience and stability may be improved by displaying a region that requires the driver's attention depending on the driving state of the vehicle in order to improve the concentration of the driver.

The driving recognizer 40 may receive the gear-shifting mode, the driving speed, or the steering angle of the vehicle, and may recognize the driving-state information of the vehicle.

The driving recognizer 40 may be connected to a transmission control unit (TCU) to communicate therewith to receive information on a gear-shifting mode, may be connected to a speed sensor of the vehicle, or the like to receive information on the vehicle speed, and may be connected to a sensor for sensing a steering angle at which a steering wheel of the vehicle is rotated or directly sensing a rotation angle at which a driving wheel is rotated to receive the rotation angle at which the driving wheel is rotated.

That is, the driving recognizer 40 may recognize the driving-state information including information on whether a vehicle is in a driving mode in which the vehicle travels forwards or a reverse mode in which the vehicle travels backwards, information on whether the vehicle travels at a high speed or low speed, and information the predicted driving path of the vehicle depending on a steering angle.

The display controller 60 may control the display device 70 to display the portion of the synthesized image including a region around a rear side when the driving recognizer 40 recognizes the vehicle to be in a reverse mode.

The surround view monitoring system for the vehicle may further include a detection sensor 20 for detecting an obstacle around the vehicle. The detection sensor 20 may include a front camera, an ultrasonic sensor, a radar device, a Lidar device, or the like.

The front camera may be a camera for photographing a region around the front side as the driving direction of the vehicle, and may also use a camera for photographing the region around the front side of the vehicle among the plurality of cameras 10. The front camera may detect an obstacle positioned at the front side of the vehicle in the image captured by photographing the region around the front side of the vehicle.

An ultrasonic sensor may be positioned on each of a front surface and a rear surface of the vehicle, and in particular, may be positioned at an edge portion of the vehicle. The ultrasonic sensor may include a transmitter for transmitting an ultrasonic wave and a receiver for receiving an ultrasonic wave, may receive an ultrasonic wave reflected by the obstacle to detect the obstacle, and may measure the distance from the obstacle.

The radar device and the Lidar device may be installed in the vehicle, and may detect the obstacle or may measure the distance from the obstacle by transmitting and receiving an electromagnetic wave.

Figure 4:
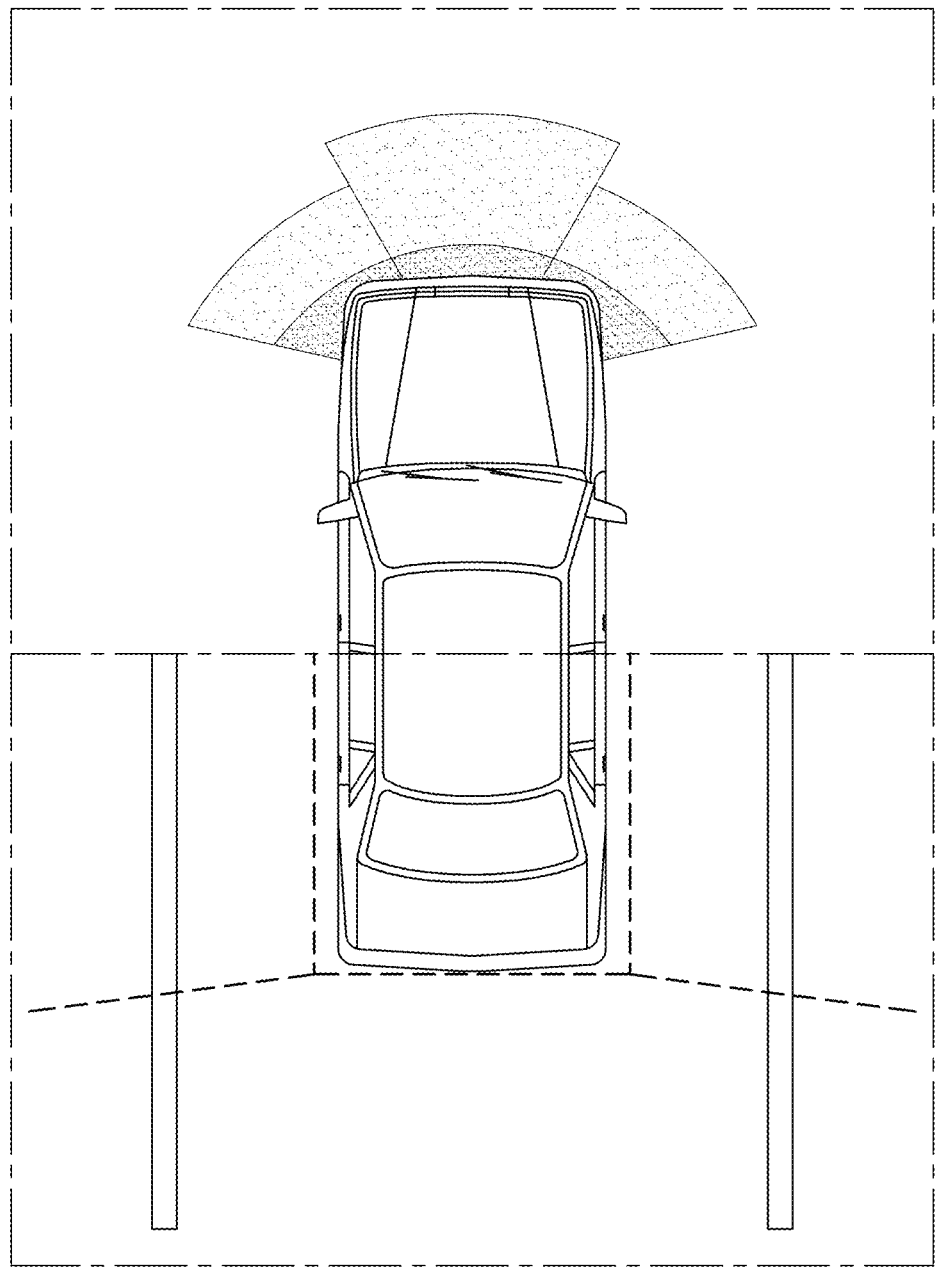
FIG. 4 is a diagram showing a portion of a synthesized image displayed on a display device according to another embodiment of the present invention.

FIG. 4 is a diagram showing a portion of a synthesized image displayed on the display device 70 according to another embodiment of the present invention.

Further referring to FIG. 4, the display controller 60 may control the display device 70 to further display front-side detection information obtained by detecting a region around the front side of the vehicle by the detection sensor 20.

The display controller 60 may display front-side detection information detected by the detection sensor 20 on a region around the front side of the vehicle while controlling the display device 70 to display a portion of the synthesized image including a region around the rear side of the vehicle.

According to an embodiment, the detection sensor 20 may be an ultrasonic sensor, and the front-side detection information may be two-dimensional detection information and may be displayed when an obstacle is positioned within a preset distance from the vehicle. Simultaneously, when the obstacle is positioned within the preset distance, a warning sound may be generated to provide a notification to a driver.

That is, according to an embodiment, the display controller 60 may enlarge and display the region around the rear side of the vehicle by controlling the display device 70 to display only a portion of the synthesized image including a region around the rear side of the vehicle, and according to another embodiment, the display controller 60 may control the display device 70 to display the front-side detection information obtained by detecting the region around the front side of the vehicle by the separate detection sensor 20 while displaying the region around the rear side of the vehicle as the synthesized image.

An image displayed on the display device 70 may be set to an option to be selected by driver manipulation, and the synthesized image displayed on the display device 70 may slide, or may be enlarged by driver manipulation.

The surround view monitoring system for the vehicle may further include the collision determiner 50 for determining whether there is a possibility of the front side of the vehicle colliding with the obstacle detected by the detection sensor 20 based on the driving-state information of the vehicle recognized by the driving recognizer 40, and the display controller 60 may control the display device 70 to display the entire synthesized image when a collision possibility determiner determines that there is the collision possibility.

The collision determiner 50 may determine whether there is a possibility of the front side of the vehicle colliding with the obstacle in a reverse mode of the vehicle. In detail, in the state in which the vehicle is in a reverse mode, when a driving wheel (in general, a front wheel) is rotated, or when an obstacle approaches the vehicle, there may be the possibility of the front side of the vehicle colliding with the obstacle.

When there is a possibility of the front side of the vehicle colliding with the obstacle, the display controller 60 may control the display device 70 to display the entirety of the synthesized image without displaying the portion of the synthesized image.

That is, when determining that the synthesized image of the region around the front side of the vehicle is requested by the driver, the display controller 60 may display the entirety of the synthesized image to the driver.

In more detail, when the detection sensor 20 detects that the obstacle is positioned at a preset distance or less from the front side of the vehicle, the display controller 60 may control the display device 70 to display the entirety of the synthesized image.

Here, the detection sensor 20 may be an ultrasonic sensor or a radar device, and, upon detecting that the obstacle is positioned within the preset distance or less from the front side of the vehicle, the display controller 60 may display the entirety of the synthesized image.

When the detection sensor 20 detects that the obstacle approaches the front side of the vehicle, the display controller 60 may control the display device 70 to display the entirety of the synthesized image.

The case in which the obstacle approaches the front side of the vehicle may include both the case in which the distance from a stationary obstacle is reduced while the vehicle travels and the case in which the obstacle moves towards the vehicle.

In particular, when there is a possibility of the front side of the vehicle colliding with the obstacle when the obstacle approaches the front side of the vehicle, the display device 70 may be controlled to display the entirety of the synthesized image.

The driving recognizer 40 may receive information on the steering angle of the vehicle, and when the received information on the steering angle is equal to or greater than a preset angle, the display controller 60 may control the display device 70 to display the entirety of the synthesized image.

In the state in which the vehicle is in a reverse mode, when the steering angle is equal to or greater than a preset angle, the front wheel of the vehicle and the front side of the vehicle may move in the direction opposite the direction in which the rear wheel of the vehicle moves. Here, the preset angle may be set to a very small angle, such as 0 degrees or 10 degrees, and may be limited only to the case in which the preset angle is set to 30 degrees and the front side of the vehicle greatly deviates in a direction opposite the direction in which the rear wheel moves.

In particular, in the case of a driver who is not familiar with driving, it may be difficult to recognize the trajectory along which the front side of the vehicle moves in a reverse state. Thus, when the steering angle of the vehicle is equal to or greater than a preset angle, the display device 70 may be controlled to display the entirety of the synthesized image including a synthesized image of the region around the front side of the vehicle.

According to another embodiment, the display controller 60 may set the trajectory of the front side or the front wheel of the vehicle according to the received information on a steering angle, and when an obstacle is positioned in the trajectory of the front side or the front wheel of the vehicle, the display device 70 may be controlled to display the entirety of the synthesized image.

Figure 5:
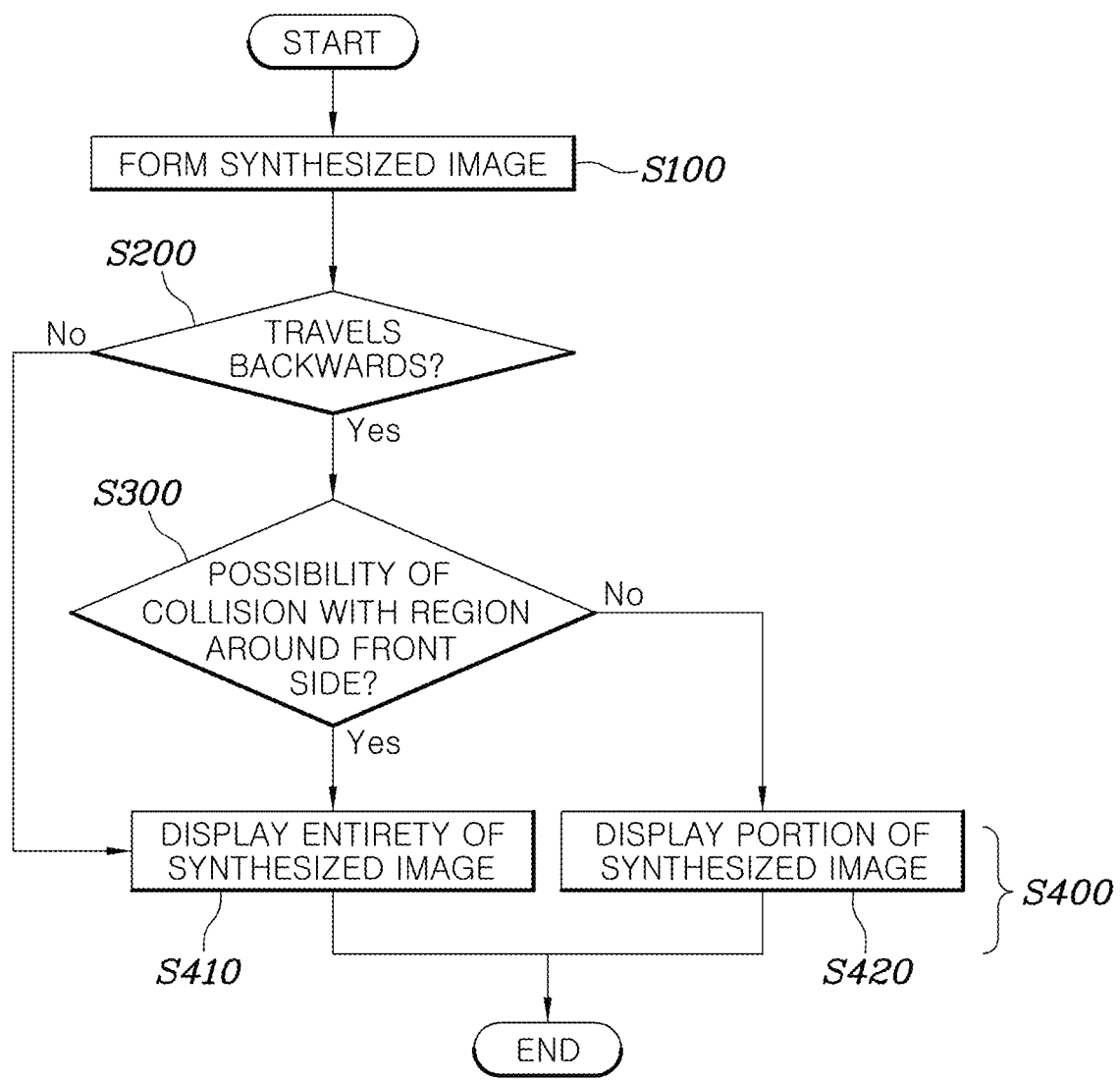
FIG. 5 is a flowchart of a surround view monitoring method for a vehicle according to an embodiment of the present invention.

FIG. 5 is a flowchart of a surround view monitoring method for a vehicle according to an embodiment of the present invention.

Further referring to FIG. 5, the surround view monitoring method for the vehicle according to an embodiment of the present invention may include operation S100 of forming a synthesized image for monitoring a region around the vehicle by synthesizing images captured by the plurality of cameras 10 for capturing the images of the region around the vehicle, and operation S400 of controlling the display device 70 to selectively display a portion or an entirety of the synthesized image based on driving-state information of the vehicle.

The method may further include operation S200 of recognizing the driving-state information of the vehicle prior to operation S400 of controlling the display device 70.

In operation S200 of recognizing the driving-state information of the vehicle, whether the vehicle travels backwards may be recognized.

In operation S400 of controlling the display device 70, the display device 70 may be controlled to display the portion of the synthesized image including the region around the rear side of the vehicle (S420) when recognizing that the vehicle travels backwards (S200).

The method may further include operation S300 of determining whether there is a possibility of the front side of the vehicle colliding with the obstacle detected by the detection sensor 20 based on the driving-state information of the vehicle prior to operation S400 of controlling the display device 70, and in operation S400 of controlling the display device 70, the display device 70 may be controlled to display the entirety of the synthesized image (S410).

Figure 6:
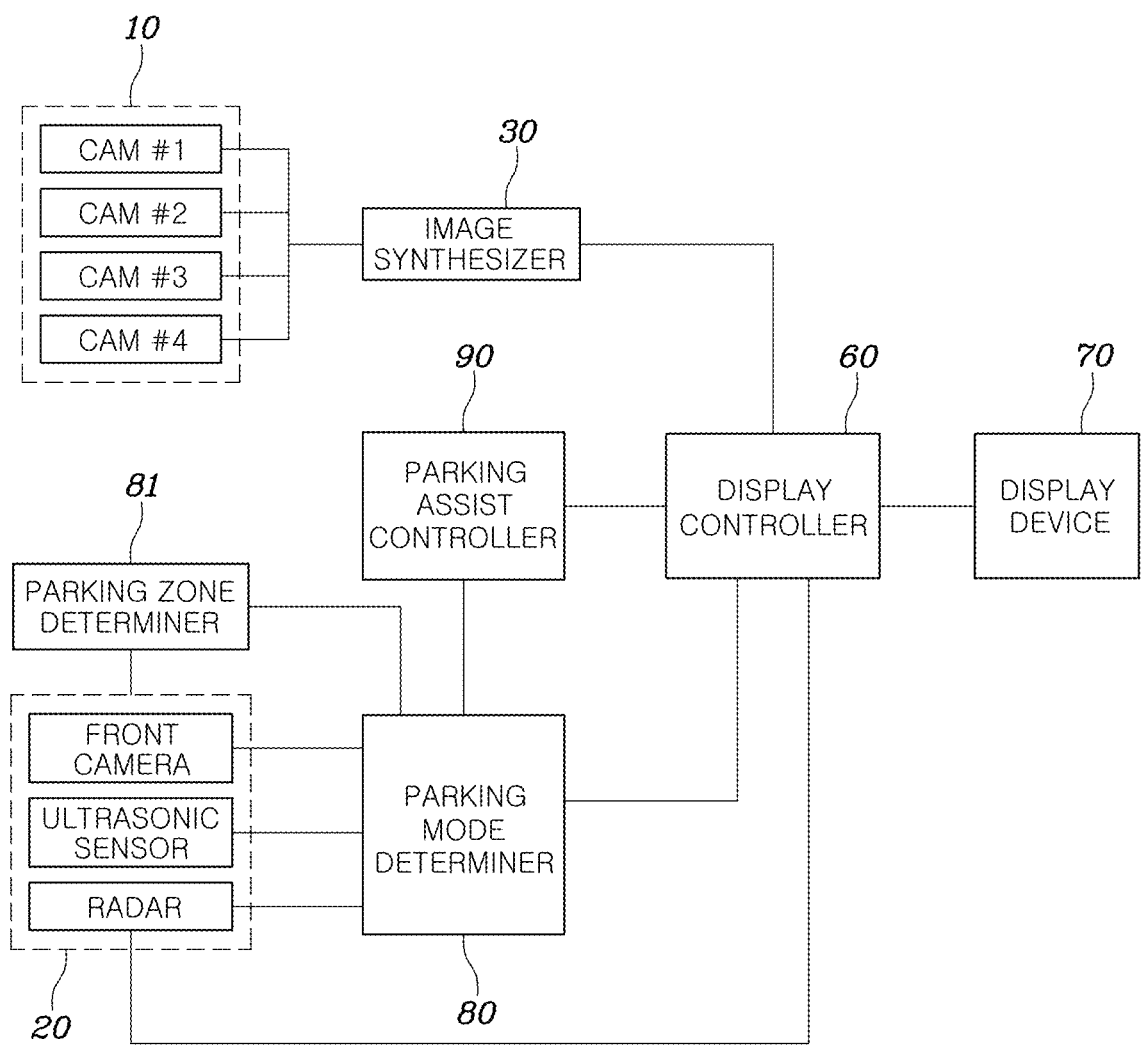
FIG. 6 is a diagram showing the configuration of a parking assist control system for a vehicle according to an embodiment of the present invention.

FIG. 6 is a diagram showing the configuration of a parking assist control system for a vehicle according to an embodiment of the present invention.

Referring to FIG. 6, the parking assist control system for the vehicle according to an embodiment of the present invention may include a detection sensor 20 for sensing information on a region around the vehicle, a parking mode determiner 80 for recognizing a parking space for the vehicle based on the information on the region around the vehicle sensed by the detection sensor 20 and determining whether the vehicle is in a forward parking mode in which the vehicle enters the recognized parking space in a forward direction or in a backward parking mode in which the vehicle enters the parking space in a backward direction, and a parking assist controller 90 for determining whether there is a possibility of the vehicle colliding with the obstacle and warning the driver of the collision possibility based on the parking mode of the vehicle, determined by the parking mode determiner 80, upon determining that there is a collision possibility or controlling the vehicle to brake.

The detection sensor 20 may include a front camera, an ultrasonic sensor, a radar device, a Lidar device, or the like.

In particular, the detection sensor 20 may be a front camera for photographing a front side of a vehicle, or may be a radar device for transmitting or receiving an electromagnetic wave.

The front camera may be a camera for photographing a region around the front side as a driving direction of the vehicle and may also use a camera for photographing the region around the front side of the vehicle, among a plurality of cameras 10. The front camera may recognize a sign, a notice board, or the like in the direction in which the vehicle travels in the image captured by photographing the region around the front side of the vehicle, or may recognize obstacles positioned around a side facing a direction (the front side) in which the vehicle travels.

The ultrasonic sensor may be positioned on a front surface and a rear surface of the vehicle, and in particular, may be positioned at an edge portion of the vehicle. The ultrasonic sensor may include a transmitter for transmitting an ultrasonic wave and a receiver for receiving an ultrasonic wave, may receive an ultrasonic wave reflected by the obstacle to detect the obstacle, and may measure the distance from the obstacle based thereon.

The radar device and the Lidar device may be installed in the vehicle, and may detect the obstacle or may measure the distance from the obstacle by transmitting and receiving an electromagnetic wave.

The parking mode determiner 80 may recognize a parking space for the vehicle based on the information on the region around the vehicle sensed by the detection sensor 20. In detail, the detection sensor 20 may recognize the parking space for the vehicle by detecting an obstacle such as a vehicle parked around another vehicle or a wall or recognizing a parking line or the like.

The parking mode determiner 80 may recognize a parking space in which a vehicle is capable of parking by recognizing a parking line, or may recognize the parking space in which the vehicle is capable of parking between the parked vehicles or walls.

The parking mode determiner 80 may determine a parking mode of the vehicle that enters the recognized parking space. According to an embodiment, when the vehicle stops and is shifted into a reverse gear-shifting mode in the state in which the vehicle moves past the recognized parking space, the vehicle may be determined to enter a backward parking mode in which the vehicle enters the parking space in a backward direction. In addition, when the vehicle enters the recognized parking space in a forward direction, the vehicle may be determined to be in a forward parking mode.

When recognizing a plurality of parking spaces, the parking mode determiner 80 may recognize a parking mode of other vehicles based on information on a region around the vehicle, and may determine that the vehicle is to be parked forwards when surrounding vehicles are parked forwards or may determine that the vehicle is to be parked backwards when the surrounding vehicles are parked backwards.

The parking assist controller 90 may determine whether there is a possibility of the vehicle and the obstacle colliding with each other by calculating a trajectory along which the vehicle travels and a trajectory along which the obstacle moves.

In detail, the parking assist controller 90 may receive information on a steering angle of the vehicle and information on a gear stage, and may calculate the trajectory along which the vehicle travels. The parking assist controller 90 may calculate the trajectory along which the obstacle moves based on the information on the region around the vehicle, sensed by the detection sensor 20. In particular, the collision possibility of the vehicle may be determined by calculating the longitudinal speed and lateral speed of the obstacle based on longitudinal and lateral directions of the vehicle.

The parking assist controller 90 may determine whether there is a possibility of the vehicle colliding with the obstacle. In particular, the parking assist controller 90 may be connected to a forward collision-avoidance assist (FCA) system, a rear cross collision warning (RCCW) system, or the like, and may determine whether there is a possibility of the vehicle colliding with the obstacle.

The parking assist controller 90 may sense a distance from an obstacle positioned around the vehicle through the detection sensor 20, and may determine whether there is a possibility of the vehicle colliding with the obstacle based on the sensed distance from the obstacle.

The parking assist controller 90 may warn the driver of the collision possibility, or may control the vehicle to brake based on the parking mode of the vehicle upon determining that there is a possibility of the vehicle colliding with the obstacle. The parking assist controller 90 may warn the driver of the collision possibility through a warning sound or through a cluster, a display device 70, or the like.

The parking assist controller 90 may be connected to an autonomous emergency braking (AEB) system, and may control a brake pedal of the vehicle to automatically brake the vehicle.

The surround view monitoring system for the vehicle may further include a parking zone determiner 81 for determining whether a vehicle enters a parking zone based on information on the region around the vehicle or position information of the vehicle, detected by the detection sensor 20, and the parking mode determiner 80 may determine a parking mode when the parking zone determiner 81 determines that the vehicle enters the parking zone.

The parking zone determiner 81 may be connected to a navigation device, and may determine whether the vehicle enters the parking zone using the position information of the vehicle and the map information. That is, when the vehicle is positioned in an external parking lot based on the map information or the vehicle is positioned inside a building, the parking zone determiner 81 may determine that the vehicle enters the parking zone.

The parking zone determiner 81 may recognize a parking lot sign based on the information on the region around the vehicle, detected by the detection sensor 20, or may recognize parked vehicles and may determine whether the vehicle enters the parking zone.

When the parking mode determiner 80 determines that the current mode is a forward parking mode, if it is determined that there is a collision possibility in the state in which the vehicle travels backwards, the parking assist controller 90 may control the vehicle to brake.

A driver may have a tendency to concentrate particularly on the front side of the vehicle in the forward parking mode of the vehicle. Thus, the driver may concentrate less on the rear side of the vehicle, and thus the possibility of the rear side of the vehicle colliding with an obstacle may be high.

In particular, when the vehicle is in a forward parking mode, the vehicle may travel backwards in order to adjust the interval between parking lines or the distance from an adjacent vehicle, and in this case, when it is determined that there is a collision possibility, the vehicle may be controlled to brake immediately. In particular, there may be a possibility of the vehicle colliding with a suddenly moving obstacle adjacent to the rear side of the vehicle.

Thus, when a collision situation in which the driver is not sufficiently paying attention occurs, the vehicle may be prevented from colliding by directly braking the vehicle.

When the parking mode determiner 80 determines that the current mode is a backward parking mode, if it is determined that there is a collision possibility in the state in which the vehicle travels backwards, the parking assist controller 90 may perform control to warn the driver of the collision possibility.

The driver concentrates on the rear side of the vehicle in the backward parking mode, and thus the driver may concentrate more on the rear side of the vehicle.

Thus, when the parking mode determiner 80 determines that the current mode is a backward parking mode, if there is a possibility of the rear side of the vehicle colliding with the obstacle, the parking assist controller 90 may warn the driver of the collision possibility through a warning sound or the like.

According to another embodiment, when there is a collision possibility in the state in which the vehicle travels forwards in a backward parking mode, the parking assist controller 90 may control the vehicle to brake.

When there is a possibility of the front side of the vehicle colliding with an obstacle in the state in which the vehicle travels backwards in the backward parking mode, the parking assist controller 90 may control the vehicle to brake.

The surround view monitoring system may further include a plurality of cameras 10 for capturing images of a region around the vehicle, an image synthesizer 30 for forming a synthesized image for monitoring the region around the vehicle by synthesizing the images captured by the plurality of cameras 10, and a display controller 60 for controlling the display device 70 to display the synthesized image formed by the image synthesizer 30 when the parking zone determiner 81 determines that the vehicle enters the parking zone.

The plurality of cameras 10 may be a device for capturing images of a region around the vehicle and may be a stereo camera. A plurality of cameras may be installed in the vehicle, and may photograph the region around the vehicle from various angles.

According to an embodiment, the plurality of cameras 10 may include a front camera, a rear camera, a left camera, and a right camera to photograph regions around a front side, a rear side, a left side, and a right side of the vehicle, respectively.

The image synthesizer 30 may form a synthesized image by synthesizing images captured by the plurality of cameras 10. The synthesized image may be an around view image. The image synthesizer 30 may correct tolerance in order to achieve high mutual consistency in a synthesis procedure.

The image synthesizer 30 may form the synthesized image that is the same as a vehicle image viewed from above by synthesizing the images captured by the plurality of cameras 10.

The display device 70 may be a device including an image displayed to a driver, included in an audio, video, and navigation (AVN) system.

The display device 70 may be a device for outputting an image of a region around the vehicle, captured by the camera, to allow a driver to check the image, and may use various image output panels such as a liquid crystal display (LCD) or an organic light-emitting diode (OLED).

Here, the display device 70 may refer to an image output panel such as an LCD, but may also refer to a product such as a personal computer (PC), a notebook computer, or a vehicle navigation device, which includes the image output panel.

The display controller 60 may control the display device 70 to display the synthesized image formed by the image synthesizer 30. Conventionally, when the vehicle speed is equal to or less than a preset speed, the display controller 60 may control the display device 70 to display the synthesized image when a gear-shifting mode of the vehicle is a reverse stage (R) or a driver selects the same.

According to an embodiment of the present invention, when the parking zone determiner 81 determines that the vehicle enters the parking zone, the display controller 60 may control the display device 70 to display the synthesized image formed by the image synthesizer 30.

That is, when the vehicle enters the parking zone, the display controller 60 may provide a surround view or an around view image to the driver through the display device 70.

Figure 7:
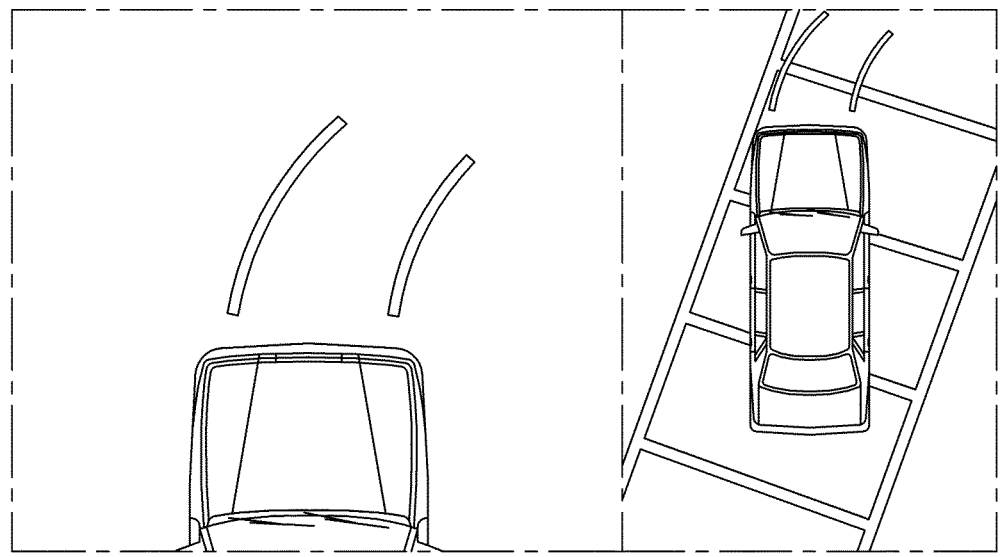
FIG. 7 is a diagram showing a synthesized image displayed on a display device according to an embodiment of the present invention.

FIG. 7 is a diagram showing a synthesized image displayed on the display device 70 according to an embodiment of the present invention.

Further referring to FIGS. 3 to 4 and 7, the display controller 60 may control the display device 70 to selectively display a portion or an entirety of the synthesized image formed by the image synthesizer 30 based on the parking mode determined by the parking mode determiner 80.

In detail, the display controller 60 may control the display device 70 to display a portion of the synthesized image including a region around a front side of the vehicle when the parking mode determiner 80 determines that the current mode is a forward parking mode, and the display controller 60 may control the display device 70 to display a portion of the synthesized image including a region around the rear side of the vehicle when the parking mode determiner 80 determines that the current mode is a backward parking mode.

According to an embodiment, as shown in FIG. 7, when the parking mode determiner 80 determines that the current mode is a forward parking mode, the display controller 60 may control the display device 70 to simultaneously display a portion of the synthesized image indicating the region around the front side of the vehicle and an entirety of the synthesized image.

The display controller 60 may also display a trajectory along which the vehicle travels together. The parking assist controller 90 may calculate the trajectory along which the vehicle travels based on a steering angle or a gear-shifting mode of the vehicle, and the display controller 60 may display the calculated trajectory, along which the vehicle travels, on the synthesized image.

According to another embodiment, as shown in FIG. 3, when the parking mode determiner 80 determines that the current mode is a backward parking mode, the display controller 60 may control the display device 70 to display a portion of the synthesized image, indicating the region around the rear side of the vehicle. In addition, the display controller 60 may control the display device 70 to simultaneously display a rear image captured by a rear camera when the vehicle travels backwards.

According to another embodiment, as shown in FIG. 4, the display controller 60 may control the display device 70 to further display the front-side detection information, obtained by detecting the region around the front side of the vehicle by the detection sensor 20.

The display controller 60 may display the front-side detection information detected by the detection sensor 20 on the region around the front side of the vehicle while controlling the display device 70 to display only the portion of the synthesized image including the region around the rear side of the vehicle on the display device 70.

The detection sensor 20 may be an ultrasonic sensor, and the front-side detection information may be two-dimensional detection information, and may be displayed when an obstacle is positioned within a preset distance from the vehicle. Simultaneously, when the obstacle is positioned within the preset distance, a warning sound may be generated to thereby provide a notification to a driver.

According to an embodiment, the display controller 60 may enlarge and display a region around a rear side of the vehicle by controlling the display device 70 to display only a portion of the synthesized image including the region around the rear side of the vehicle, and according to another embodiment, the display controller 60 may control the display device 70 to display the front-side detection information detected by the separate detection sensor 20 as the remaining region around a front side of the vehicle while displaying the region around the rear side of the vehicle as the synthesized image.

An image displayed on the display device 70 may be set to an option to be selected by driver manipulation, and the synthesized image displayed on the display device 70 may slide or may be enlarged by driver manipulation.

When the parking assist controller 90 determines that there is a possibility of the front side of the vehicle colliding with the obstacle, the display controller 60 may control the display device 70 to display the entirety of the synthesized image.

The parking assist controller 90 may determine whether there is a possibility of the front side of the vehicle colliding with the obstacle when the vehicle travels backwards. In detail, in the state in which the vehicle travels backwards, when a driving wheel (in general, a front wheel) is rotated or an obstacle approaches the vehicle, there may be a possibility of the front side of the vehicle colliding with the obstacle.

When there is a possibility of the front side of the vehicle colliding with the obstacle, the display controller 60 may control the display device 70 to display the entirety of the synthesized image without displaying the portion of the synthesized image.

That is, when determining that the synthesized image of the region around the front side of the vehicle is requested by the driver, the display controller 60 may display the entirety of the synthesized image to the driver.

In more detail, when the detection sensor 20 detects that the obstacle is positioned at a preset distance or less from the front side of the vehicle, the display controller 60 may control the display device 70 to display the entirety of the synthesized image.

Here, the detection sensor 20 may be an ultrasonic sensor or a radar device, and when the detection sensor 20 detects that the obstacle is positioned at a preset distance or less from the front side of the vehicle, the display controller 60 may display the entirety of the synthesized image.

When the detection sensor 20 detects that the obstacle approaches the front side of the vehicle, the display controller 60 may control the display device 70 to display the entirety of the synthesized image.

The case in which the obstacle approaches the front side of the vehicle may include both the case in which the distance from a stationary obstacle is reduced while the vehicle travels and the case in which the obstacle moves towards the vehicle.

In particular, when there is a possibility of the front side of the vehicle colliding with the obstacle when the obstacle approaches the front side of the vehicle, the display device 70 may be controlled to display the entirety of the synthesized image.

When the received steering angle is equal to or greater than a preset angle, the display controller 60 may control the display device 70 to display the entirety of the synthesized image.

In the state in which the vehicle is in a reverse mode, when the steering angle is equal to or greater than a preset angle, a front wheel of the vehicle and a front side of the vehicle may be moved in the direction opposite the direction in which the rear wheel of the vehicle moves. Here, the preset angle may be set to a very small angle, such as 0 degrees or 10 degrees, and may be limited to the case in which the preset angle is set to 30 degrees and the front side of the vehicle greatly deviates in a direction opposite the direction in which the rear wheel moves.

In particular, in the case of a driver who is not familiar with driving, it may be difficult to recognize the trajectory along which the front side of the vehicle moves when travelling in reverse. Thus, when the steering angle of the vehicle is equal to or greater than a preset angle, the display device 70 may be controlled to display the entirety of the synthesized image including a synthesized image of the region around the front side of the vehicle.

According to another embodiment, the display controller 60 may set the trajectory of the front side or the front wheel of the vehicle according to the received information on a steering angle, and when an obstacle is positioned in the trajectory of the front side or the front wheel of the vehicle, the display controller 60 may control the display device 70 to display the entirety of the synthesized image.

The surround view monitoring system and method for a vehicle according to the present invention may improve convenience and stability by displaying a region in which a driver's attention is required depending on the driving state of the vehicle to improve the concentration of the driver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A surround view monitoring system for a vehicle, comprising:
   a plurality of cameras included in the vehicle and configured to capture images of a region around the vehicle;
   an image synthesizer configured to form a synthesized image for monitoring the region around the vehicle by synthesizing the images captured by the plurality of cameras;
   a driving recognizer configured to receive driving-state information of the vehicle;

a display controller configured to control a display device to selectively display only a portion or an entirety of the synthesized image formed by the image synthesizer based on the driving-state information of the vehicle, recognized by the driving recognizer,
  wherein the display controller is configured to control the display device to display only the portion of the synthesized image, containing a side region of the vehicle corresponding to a side of the vehicle facing a parking direction when the vehicle is in a parking mode; and
  wherein the display controller is further configured to control the display device to display the entirety of the synthesized image, in response to a steering angle of the vehicle being equal to or greater than a preset angle when in the parking mode;
a detection sensor configured to detect an obstacle around the vehicle, and
a collision possibility determiner configured to determine whether there is a possibility that a front side of the vehicle collides with the obstacle detected by the detection sensor based on the driving-state information of the vehicle,
  wherein the display controller is further configured to control the display device to display the entirety of the synthesized image, in response to the collision possibility determiner determining that there is a collision possibility.

2. The surround view monitoring system for the vehicle of claim 1, wherein the driving recognizer is further configured to receive information on a gear-shifting mode, a driving speed, or the steering angle of the vehicle and recognizes the driving-state information of the vehicle.

3. The surround view monitoring system for the vehicle of claim 1, further comprising:
  a detection sensor configured to detect an obstacle around the vehicle,
  wherein the display controller is further configured to control the display device to further display front-side detection information obtained by detecting a region around a front side of the vehicle by the detection sensor when the vehicle is in the parking mode and the parking direction is in a reverse direction.

4. The surround view monitoring system for the vehicle of claim 1, further comprising:
  a detection sensor configured to detect an obstacle,
  wherein the display controller is further configured to control the display device to display the entirety of the synthesized image, in response to the detection sensor detecting that the obstacle is positioned at a preset distance or less from a front side of the vehicle or the obstacle approaches the front side of the vehicle when the vehicle is in the parking mode and the parking direction is in a reverse direction.

5. The surround view monitoring system for the vehicle of claim 1, further comprising:
  a detection sensor configured to detect an obstacle around the vehicle, and a collision possibility determiner configured to determine whether there is a possibility that a front side of the vehicle collides with the obstacle detected by the detection sensor based on the driving-state information of the vehicle,
  wherein the display controller is further configured to control the display device to display the entirety of the synthesized image, in response to the collision possibility determiner determining that there is a collision possibility.

6. The surround view monitoring system for the vehicle of claim 1, further comprising:
  a detection sensor configured to detect an obstacle around the vehicle, and
  a collision possibility determiner configured to determine whether there is a potential collision with the obstacle at an opposite side of the vehicle from the parking direction of the vehicle detected by the detection sensor based on the driving-state information of the vehicle,
  wherein the display controller is further configured to control the display device to display the entirety of the synthesized image, in response to the determining of the potential collision.

7. The surround view monitoring system for the vehicle of claim 1, wherein the driving-state information including a parking mode indication, a steering angle of the vehicle, and a parking direction.

8. A surround view monitoring method for a vehicle, the method comprising:
  forming a synthesized image for monitoring a region around the vehicle by synthesizing images captured by a plurality of cameras configured to capture images of the region around the vehicle;
  receiving driving-state information of the vehicle;
  controlling a display device to selectively display only a portion or an entirety of the synthesized image based on the driving-state information of the vehicle, wherein the portion includes a region around a side of the vehicle in a parking direction when a parking mode is active,
    wherein the controlling of the display device comprises controlling the display device to display only the portion of the synthesized image, and
    wherein, when the parking mode is active and when a steering angle of the vehicle is equal to or greater than a preset angle, the display device is controlled to display the entirety of the synthesized image; and
  detecting an obstacle around the vehicle, and
  determining whether there is a possibility that a front side of the vehicle collides with the obstacle based on the driving-state information of the vehicle,
    wherein controlling of the display device further comprises controlling the display device to display the entirety of the synthesized image, in response to determining that there is a collision possibility.

9. The method of claim 8, further comprising:
  prior to the controlling of the display device, determining whether there is a possibility that a front side of the vehicle collides with an obstacle detected by a detection sensor based on the driving-state information of the vehicle when the vehicle is in the parking mode and the parking direction is in a forward direction,
  wherein the controlling of the display device comprises controlling the display device to display the entirety of the synthesized image.

10. The method of claim 8, further comprising, prior to the controlling of the display device, determining whether there is a potential collision with an obstacle on a second side of the vehicle opposite to the side of the vehicle in the parking direction detected by a detection sensor based on the driving-state information of the vehicle when the vehicle is in the parking mode,
  wherein the controlling of the display device comprises controlling the display device to display the entirety of the synthesized image responsive to the determining of the potential collision.

* * * * *